United States Patent [19]

Heiges et al.

[11] Patent Number: 4,890,408

[45] Date of Patent: Jan. 2, 1990

[54] WATERFOWL DECOY

[75] Inventors: Charles W. Heiges, 2156 E. State Rd., Port Clinton, Ohio 43452; Richard L. Hamrick, Jr., Toledo, Ohio

[73] Assignee: Charles W. Heiges, Port Clinton, Ohio

[21] Appl. No.: 321,085

[22] Filed: Mar. 9, 1989

[51] Int. Cl.$^4$ ............................................. A01M 31/06
[52] U.S. Cl. ............................................................ 43/3
[58] Field of Search ............................................. 43/2, 3

[56] References Cited

U.S. PATENT DOCUMENTS

| | | | |
|---|---|---|---|
| 512,810 | 1/1894 | Curlin | 43/3 |
| 2,185,013 | 12/1939 | Bonetti | 43/3 |
| 2,706,357 | 4/1955 | Nigh et al. | 43/3 |
| 2,755,588 | 7/1956 | Johnson | 43/3 |
| 2,799,961 | 7/1957 | Jaumotte | 43/3 |
| 3,733,733 | 5/1973 | Ruter | 43/3 |
| 3,798,820 | 3/1974 | Pye | 43/3 |
| 3,888,032 | 6/1975 | Gagnon | 43/3 |

*Primary Examiner*—M. Jordan
*Attorney, Agent, or Firm*—Richard C. Darr

[57] ABSTRACT

A waterfowl decoy comprising a solid molded body having a layer of burlap-like material adhesively secured to its outer surface. The fabric covering is coated with the adhesive. A shaped head is affixed to the body, and the coated fabric layer is painted to resemble a selected waterfowl species. A keel including means for securing and retaining an anchor line is provided on the bottom of the body. The keel includes a recess particularly adapted for retaining a deployed anchor line.

14 Claims, 1 Drawing Sheet

WATERFOWL DECOY

BACKGROUND OF THE INVENTION

1. Field of the Invention

The present invention relates broadly to decoys for use in the hunting of waterfowl such as ducks and geese, and more particularly to a novel decoy construction.

2. Description of the Prior Art

Various types of decoys have been employed heretofore in the hunting of waterfowl such as ducks and geese in order to attract the fowl and entice them to fly over or land on a designated particular area of land or water. When hunting is to be conducted in a selected area, a number of decoys are deployed in the area to attract overflying fowl to that area. Of course, the more natural and prominent the deployed decoys can be made to appear, the more likely they are to attract overflying fowl. The body and head configuration, the surface coloring and texture, and the manner in which the anchored decoy rides or floats in the water, all influence the appearance of a group of decoys.

Efforts have continued over the years to improve the appearance and performance of such decoys, and to that end it has been suggested the bodies may be formed in various ways. For example, U.S. Pat. No. 547,033 discloses a decoy formed by filling a fabric covering affixed to a floating base with loose material such as grass, straw, leaves, paper, or excelsior. U.S. Pat. No. 2,719,376 pertains to a decoy having a hollow molded pulp body. U.S. Pat. No. 3,704,538 suggests a decoy having an air inflatable body portion, while the decoy of U.S. Pat. No. 3,888,032 employs as the body a flexible, resilient, molded shell which is collapsible but which will return to its original shape when the collapsing force is removed. The surfaces of the bodies are generally configured and ornamented in one way or another to resemble, as nearly as possible, the feather arrangement and coloring of a particular species of waterfowl. In most present day decoys the surface of the body itself is formed with a feature appropriate to achieve the desired visual effect, and the surface is then painted or decorated. Such an arrangement has not been found entirely satisfactory in that the surface does not present a realistic appearance and the finish is often damaged by the rough handling to which the decoys are subjected.

Most present day decoys are also provided with a keel structure as typically shown by the aforementioned patents. Such keels serve a dual purpose in that they both provide stability and a more life-like stance to the decoy as it floats on the surface of the body of water, and further provide a means for affixing a line to the decoy for anchoring it at selected locations. The keel thus stabilizes the decoy to minimize unnaturally appearing rotation, rocking, and sidewise movement due to winds, waves and currents. It also serves to maintain the decoy in an upright position and to right the decoy should it overturn or be initially deployed in an overturned position. The keels have included various arrangements for not only affixing the anchor line to the decoy, but also for storing the line in a wrapped condition while the decoy is not in use and for storing excess line to permit effective use of the anchor in bodies of water of different depths. Again, the prior art keel constructions have not proven entirely satisfactory in that they tend to be expensive to produce and complicated and cumbersome to use. Such decoys are often deployed and retrieved under very adverse conditions since waterfowl hunting is most successfully conducted during periods of adverse cold, rainy, windy weather. Thus, it is highly desirable that the anchor line be readily manipulated during deployment and retrieval and that it remain securely in the selected position during deployment of the decoy.

SUMMARY OF THE INVENTION

In accordance with the present invention, there is provided a waterfowl decoy of novel and improved construction. The decoy includes a solid molded body as of a foamed plastic material, to which is affixed a shaped head. A layer of burlap or burlap-like fabric is adhesively secured to the outer surface of the body, and the fabric layer is coated with the adhesive. The coated fabric layer is appropriately painted to resemble a selected waterfowl species. A keel structure having a configuration particularly adapted to accommodate an anchor line for storage and to readily permit deployment of a selected length of the line and retain the line in the deployed position during use of the decoy, is affixed to the body.

It is, therefore, a primary object of the invention to provide a waterfowl decoy which is realistic in appearance deployed on a body of land or water.

Another object of the invention is to provide a waterfowl decoy which is durable and has a relatively long service life.

Another object of the invention is to provide a waterfowl decoy having a realistic looking matte surface which is not readily susceptible to injurious chipping, cracking and denting.

Another object of the invention is to provide a waterfowl decoy with a keel construction adapted to facilitate deployment, retention, retrieval and storage of an anchor line.

Still another object of the invention is to provide a durable waterfowl decoy which, for its durability and quality, is relatively inexpensive to manufacture.

Other objects and advantages will become more apparent during the course of the following description, when taken in connection with the accompanying drawing.

BRIEF DESCRIPTION OF THE DRAWING

In the drawing, wherein like numerals refer to like parts throughout.

DESCRIPTION OF THE PREFERRED EMBODIMENTS

Figure 1:
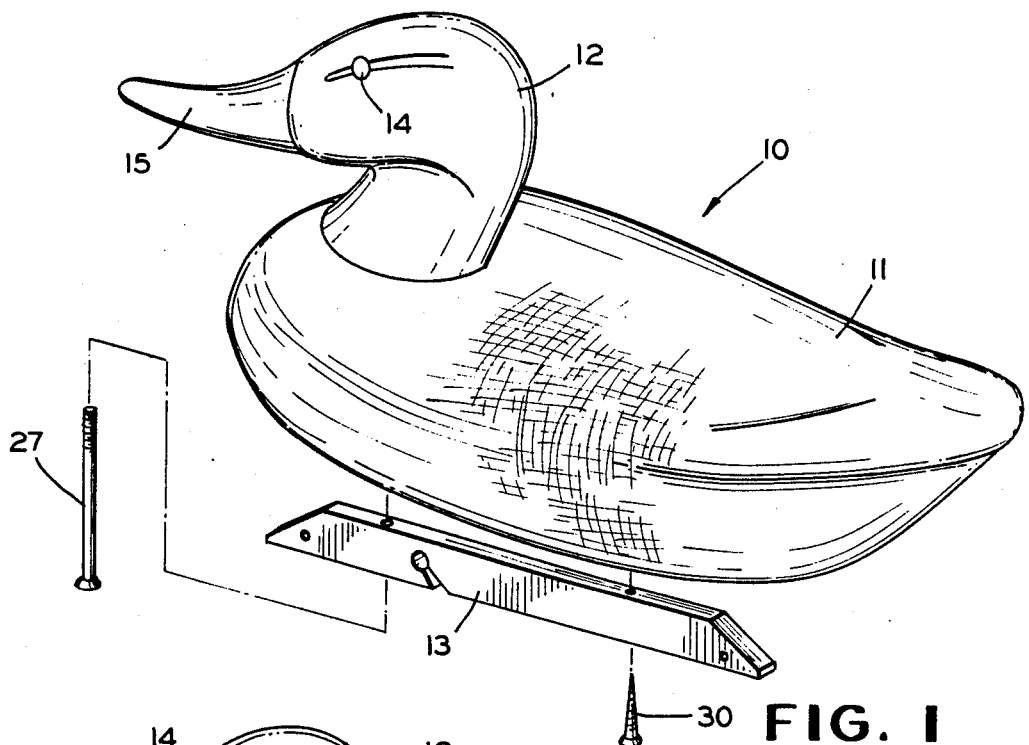
FIG. 1 is an exploded perspective view of a decoy embodying the invention.

Referring now to the drawings, there is shown generally at 10 a waterfowl decoy embodying the invention. More particularly, the decoy includes a body 11 to which is affixed a head 12 and a keel 13. The head 12 is conventionally formed as of molded plastic or carved wood, and is subsequently painted to include eyes 14, a bill 15, and other markings resembling in color and configuration the head of a selected one of the many duck and goose waterfowl species.

Figure 2:
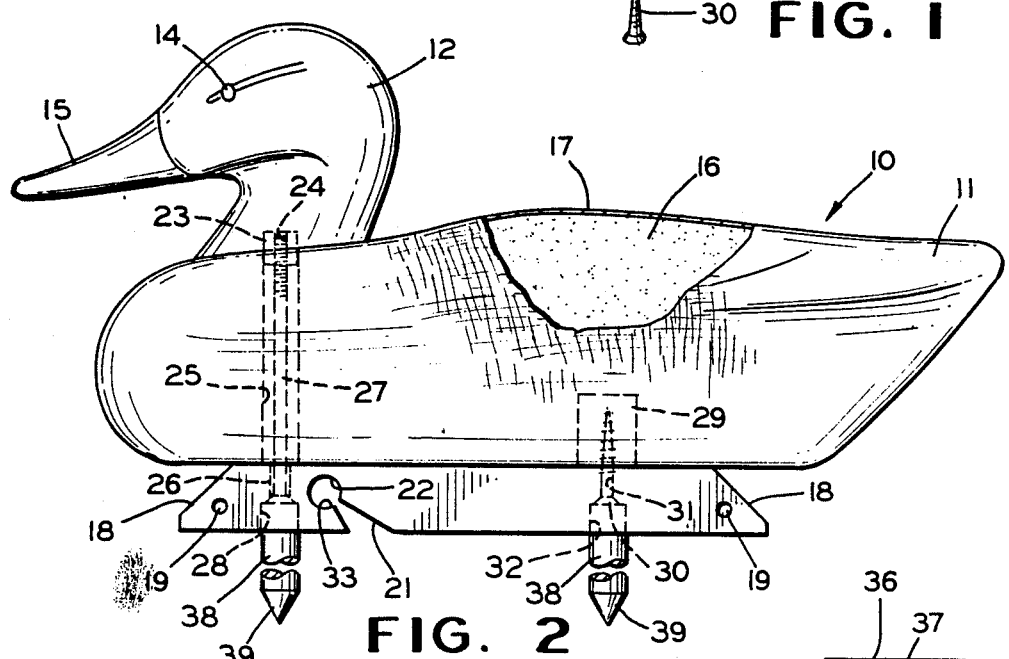
FIG. 2 is a side elevational view of the decoy.

As best seen in FIG. 2, the body 11 comprises a solid molded section 16 covered by one or more layers 17 of a coarse fabric material, preferably ordinary burlap. The body must be durable so as to be capable of withstanding rough handling and must not absorb water or become water logged even after prolonged periods of exposure in the water. To that end, the molded section 16 is preferably formed of a durable, closed cell foamed plastic material such as, for example, the well-known product sold under the name Styrofoam. The burlap layer or covering 17 is affixed to the molded section by first coating the surface of the body with a suitable adhesive, and then wrapping the body with the burlap fabric. A coating of the adhesive is applied over the fabric coating to insure that the fabric is saturated with the adhesive while leaving the spaces in the burlap unfilled so as to present a textured, matte finish. A preferred form of adhesive is an acrylic latex adhesive of the type comprising a latex base. Such material is compatible with the material of the molded body and has negligible solubility in water, and thus both permanently secures the burlap to the molded section and prevents its deterioration and rotting even after repeated and prolonged exposure to water and weather. The coated burlap has a somewhat rough finish which, when painted, has a desirable realistic appearance.

Figure 3:
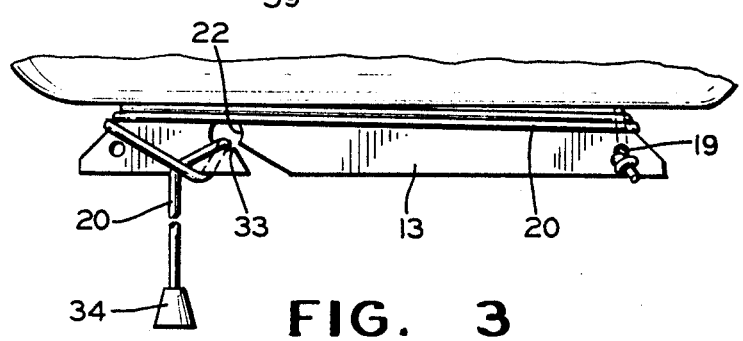
FIG. 3 is a fragmentary side elevational view of the keel illustrating the anchor line in extended position.

For facilitating transportation and deployment, decoys should be as light in weight as possible while still hugging the water surface under all conditions. Due to its unique construction, the present decoy is easy to handle and should not pitch, rise up off the water or tip over under any wind or wave conditions suitable for hunting. The keel 13 which is affixed along the longitudinal center line of the bottom of the body 11, comprises an elongated, generally rectangular member of a suitable material such as a hardwood, which will not readily absorb water or which can be treated to prevent absorption. At each end the keel has a tapered or angled portion 18 for a purpose to be described. A hole 19 extends transversely through the keel adjacent either end for securing one end of an anchor line 20 as shown in FIG. 3. The keel is further provided in its forward portion with a tapered slot 21 extending inwardly from its base and terminating in an enlarged opening 22 for a purpose to be described.

The head 12 and the keel 13 are affixed to the body 11 after the fabric layer or covering 17 has been applied and the covering suitably painted and ornamented. The head may include a fitting 23 having interior threads 24. An opening 25 extends through the body section 16 beneath the head, and a matching opening 26 is provided in the keel for receiving a bolt or screw 27 which extends through the opening 25 and is threaded into the fitting 23. The keel is counterbored at 28 to receive the head of the bolt or screw 27. An insert 29 is provided within the molded body section 16 for receiving a screw 30 extending through an opening 31 at the rear of the keel. A counterbore 32 is provided in the keel for recessing the head of the screw 30.

The tapered slot 21 and enlarged opening 22 are so constructed that at their intersection raised lip 33 is formed between the bottom of the circular opening and the entrance to the slot. The raised lip serves an important function in deploying and anchoring the decoys. Thus, as shown in FIG. 3, the decoys are provided with an anchor line 20 of sufficient length to reach bottom in the deepest water expected to be encountered. A weight 34 is affixed to the end of the line. During retrieval and storage of the decoys, the line is wrapped around the angled portions 18 of the keel between the keel and the body section. When the decoy is deployed, the desired amount of line is unwound from the keel, and a loop is formed by crossing the line over itself and then inverting the loop 180 degrees. The loop is inserted through the slot 21 into the enlarged opening 22 and behind the lip 33. The slot and lip thus provide a means of quickly and simply setting and securely retaining the line at the desired position, both during storage and deployment of the decoys. The loop arrangement draws the line down into the opening behind the raised lip so that it will not be accidentally dislodged, even should the free end portion of the line not be kept taut at all times. Nevertheless the loop can be manually loosened and the string removed from the slot and wound for storage during recovery of the deployed decoys.

Figure 4:
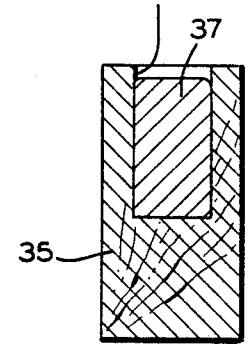
FIG. 4 is a transverse section through a keel illustrating an alternate embodiment having a recess for receiving a weight.

There is shown in FIG. 4 an alternate embodiment of the keel for providing additional weight and greater stability to the decoy. The alternate keel 35 includes an elongated central recess 36 containing a body 37 of a relatively heavy material such as lead. In all other respects, the alternate keel is identical to the previously described keel 13, and may be substituted therefore where additional weight is desired beneath the body to cause it to ride lower in the water and to have a greater uprighting moment.

In some instances it may be desireable to deploy the decoys on/and as adjacent a body of water or other area frequented by waterfowl. It is highly desirable in such cases that the decoys stand erect and present a natural appearance. Due to the presence of the keel on the bottom of the body, such decoys heretofore, when set on land, tended to tilt to one side or the other. In accordance with the invention the decoys may be made to sit erect by providing beneath the keel, posts which can be forced into the ground a short distance as the decoys are deployed. To that end, as shown in FIG. 2, post members 38 are inserted into the counterbores 28 and 32 to project downwardly beneath the keel for insertion into the ground (not shown). The post members may, for example, be short sections of dowel rod and may be provided with pointed ends 39 for facilitating insertion into the ground. They may be permanently affixed as by being glued within the counterbores 28 and 32, or they may be removably inserted therein by being dimensioned to have a light press fit.

Reviewing briefly fabrication of the decoy, the head 12 is molded or otherwise formed and painted with the distinctive markings of a waterfowl species as desired. The body section 16 is likewise formed as by molding from a tough, durable, foamed plastic material such as Styrofoam, and preferably having a density of at least three and one half pounds per cubic foot. The insert 29 is placed into and glued within an opening suitably provided in the body.

The body 16 is completely coated with an adhesive such as an acrylic latex material which when cured, is not soluble in water. The body section is then wrapped in, and completely encased by, the burlap fabric layer 17, and a coating of the adhesive is applied to the burlap so that the fibers are completely impregnated with adhesive. After the adhesive dries and cures, the surface is painted and decorated with appropriate markings, using a paint which dries to a flat finish on the burlap so as to present a natural appearance. Since the burlap to which it is applied presents a rough, textured surface, the paint adheres extremely well and exhibits minimal cracking or chipping under extreme conditions of use. The head and keel are then assembled on the body. In order to securely affix the head, adhesive is applied to the mating surfaces of the head and body, and the bolt or screw 27 is inserted and tightened to urge the head and keel into engagement with the body section. The head, is thus rigidly attached so as to not permit wedging of anchor lines therebeneath and accidental loss of heads as happens with the adjustable heads of some prior art decoys The screw 30 is inserted and the line 20 is affixed to the keel through one of the holes 19 to complete assembly of the decoy.

There thus is provided a durable, attractive decoy which is able to absorb shot when accidentally hit, and will not absorb water even when used repeatedly and for extended periods. The decoy is relatively inexpensive to fabricate, and yet exceeds in quality comparable decoys costing much more to make.

It is to be understood that the forms of the invention herewith shown and described are to be taken as illustrative embodiments of the same, and that various changes in the shape, size and arrangements of parts may be resorted to without departing from the spirit of the invention.

What is claimed is:

1. A waterfowl decoy including an elongated body having an exterior surface, a fabric covering adhesively secured over substantially all of said surface, said fabric covering comprising a coarse, woven material, a head affixed to said body, and an elongated keel extending longitudinally along the bottom of said body, said keel comprising an elongated member terminating at each end in a portion tapering upwardly and inwardly toward the bottom of said body, a base along its marginal edge opposite said body, and a slot tapering inwardly from said base and terminating in an enlarged opening extending transversely through said keel.

2. A waterfowl decoy as claimed in claim 1, wherein said fabric covering is a coarse, woven material.

3. A waterfowl decoy as claimed in claim 1 wherein said coarse, woven material is burlap.

4. A waterfowl decoy as claimed in claim 3, wherein said burlap is secured by an acrylic latex adhesive.

5. A waterfowl decoy as claimed in claim 4, including a first coating of said adhesive applied over said body to secure said burlap, and a second coating of said adhesive applied over said burlap.

6. A waterfowl decoy as claimed in claim 5, wherein said body is a molded body of tough, durable, closed-cell, foamed plastic.

7. A waterfowl decoy as claimed in claim 5, wherein said burlap is saturated by said second coating of adhesive and the spaces between the woven fibers thereof are unfilled whereby said covering presents a textured, matte finish.

8. A waterfowl decoy as claimed in claim 1, including a raised lip on said enlarged opening at its junction with said tapered slot, said raised lip being formed between the bottom of said opening and the entrance to said slot.

9. A waterfowl decoy as claimed in claim 8, including a second opening extending transversely through said keel, and an anchor line affixed at one end through said second opening, said anchor line being adapted to wrap around said keel at said tapered ends thereof and loop through said tapered slot and enlarged opening to rest behind said raised lip whereby said anchor line is retained securely in place.

10. A waterfowl decoy as claimed in claim 1, including an elongated recess in said keel, and a body of heavy material contained within said recess for providing additional weight to said keel.

11. A waterfowl decoy as claimed in claim 9, wherein said fabric covering is burlap, said burlap being secured by an acrylic latex adhesive, and including a first coating of said adhesive applied over said body to secure said burlap and a second coating of said adhesive applied over said burlap, said burlap being saturated by said second coating of adhesive and the spaces between the woven fibers being unfilled, whereby said covering presents a textured, matte finish.

12. A waterfowl decoy as claimed in claim 1, including at least one post extending outwardly from said base adapted for insertion into a supporting material for maintaining said decoy in an erect position.

13. A waterfowl decoy as claimed in claim 12, including a counterbore in said base, one end of said post extending into said counterbore and the other end thereof being tapered to facilitate insertion into said supporting material.

14. A waterfowl decoy as claimed in claim 11, including a spaced pair of posts depending outwardly from said base adapted for insertion into a supporting material for maintaining said decoy in an erect position, including spaced counterbores in said base, one end of each said post being fixedly received in one of said counterbores.

* * * * *